(No Model.)

G. W. COWAN.
BREAD RAISING APPARATUS.

No. 554,479.  Patented Feb. 11, 1896.

Witnesses:
J. K. Bartou
A. S. Hunzker

Geo. W. Cowan
Inventor.
By J. H. Stevenson
Attorney

UNITED STATES PATENT OFFICE.

GEORGE W. COWAN, OF CANNONSBURG, PENNSYLVANIA.

BREAD-RAISING APPARATUS.

SPECIFICATION forming part of Letters Patent No. 554,479, dated February 11, 1896.

Application filed February 6, 1893. Serial No. 461,214. (No model.)

*To all whom it may concern:*

Be it known that I, GEORGE W. COWAN, a citizen of the United States, residing at Cannonsburg, in the county of Washington and State of Pennsylvania, have invented certain new and useful Improvements in Bread-Raising Apparatus; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain improvements in dough or bread raisers, and has for its object to provide a device of this character of a simple, inexpensive and durable nature which shall present certain novel features of construction and advantages for use over other similar devices heretofore employed, all as will be hereinafter fully set forth.

The novel features of my invention will be carefully defined in the claim.

Figure 1:
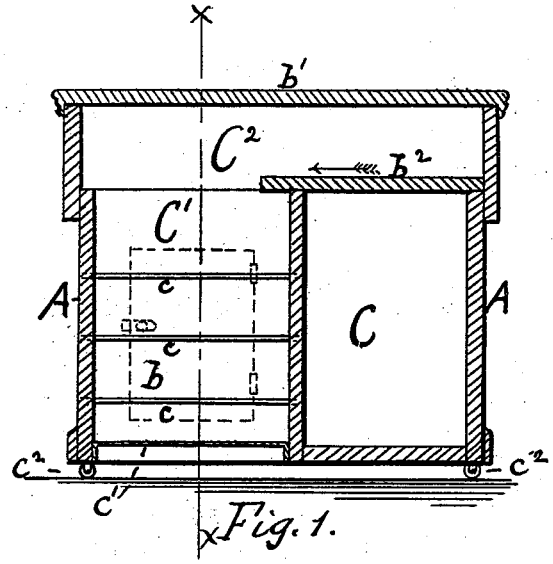
Figure 2:
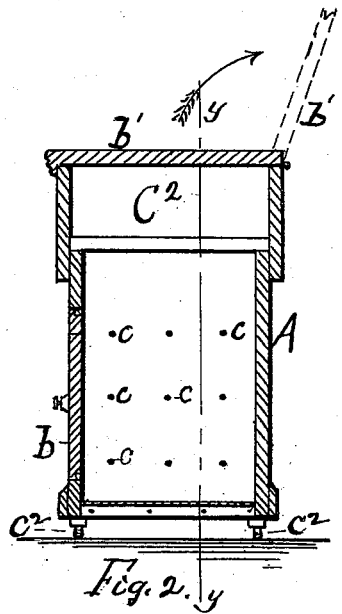
Figure 3:
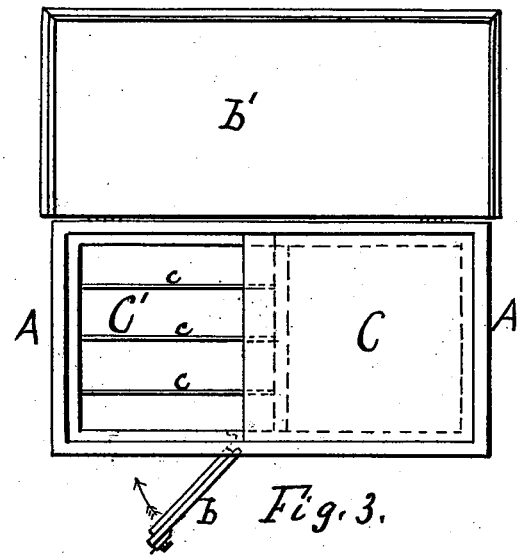

In the accompanying drawings, illustrative of my invention, Figure 1 is a vertical longitudinal section of a bread or dough raiser embodying my improvements; and Fig. 2 is a transverse section of the same, taken through the heating-chamber. Fig. 3 is a plan view of the device with the cover opened.

In the views, A represents a rectangular casing, the interior of which has, somewhat below its upper end, an offset or shoulder, forming a guideway on which rests and is movable a kneading-board $b^2$. The casing is also provided at about its center with a transverse vertical partition, which extends from the bottom of the casing up to the offset or guideway on which the board $b^2$ rests and slides. Thus it will be seen that the interior of the casing A is divided into two lower chambers C and C', arranged side by side, and an upper chamber $C^2$, to which latter access may be had by lifting the cover $b'$ of the apparatus, which cover is hinged to one side of the casing A, as clearly seen.

One of the lower chambers, C, is a flour-receptacle and has a wooden bottom, and the other chamber, C', is the heating-chamber and has a bottom $c'$ of flanged sheet metal, and is further provided with shelves made up of series of wire rods $c\ c$ arranged across it. A door $b$ in one wall of the casing A gives access to chamber C'.

The chamber $C^2$ is a kneading-chamber and its bottom is formed by the kneading-board $b^2$, which, as before stated, is longitudinally movable, so as to permit access to either of chambers C or C' from chamber $C^2$. This gives an important advantage. The mixing-pan may be set upon the kneading-board $b^2$, which will then be so arranged as to cover the flour-receptacle or chamber C to prevent the spilling of water, &c., therein, and when it is desired to procure more flour it will only be necessary to move the board and pan back so as to uncover chamber C'. Moreover, this chamber forms practically a continuation of chamber C', and may be used in conjunction therewith for raising dough by leaving the board $b^2$ in the position shown in the drawings, so that the flour-chamber C will be covered and chamber C' open.

When the dough has been properly kneaded, it is placed in pans in the chamber C', and the kneading-board $b^2$ may be slid over so as to cover said chamber, as will be readily understood.

To impart the necessary heat to the air in the chamber C', a heated iron or brick may be set upon the sheet-metal bottom $c'$ thereof, or a lamp or other source of heat may be arranged under said bottom. The employment of a sheet-metal bottom for the heating-chamber C' possesses advantages over a wooden bottom, inasmuch as if the iron or brick be too hot the wood would be scorched and the odor thereof would be imparted to the dough in the chamber. Such a bottom, moreover, radiates its heat better to the air within the chamber.

Having thus described my invention, I claim—

In a bread-raiser, a casing having a hinged cover and a horizontal guideway formed in its interior intermediate between the said cover and the bottom of the casing, said casing being also provided with a transverse vertical partition extending from its bottom up to the said guideway, whereby a flour-chamber and a heating-chamber are formed therein, each of said chambers having an open top and the heating-chamber having a metal bottom and a door formed through the wall of the casing and a kneading-board mounted to slide on the horizontal guideway in the upper part of the casing and adapted to close the open upper end of each of said chambers, substantially as set forth.

In testimony whereof I affix my signature in presence of two witnesses.

GEORGE W. COWAN.

Witnesses:
W. A. BLAKELEY,
A. BLAKELEY.